United States Patent [19]

Allan

[11] Patent Number: 5,345,659
[45] Date of Patent: Sep. 13, 1994

[54] CONNECTOR APPARATUS WITH NESTING RIDGES

[76] Inventor: Robert M. Allan, 1631 Colgate Cir., La Jolla, Calif. 92037

[21] Appl. No.: 5,331

[22] Filed: Jan. 15, 1993

Related U.S. Application Data

[63] Continuation-in-part of Ser. No. 787,424, Nov. 12, 1991, Pat. No. 5,179,767, which is a continuation-in-part of Ser. No. 553,258, Jul. 16, 1990, Pat. No. 5,088,162.

[51] Int. Cl.$^5$ .............................................. A44B 13/00
[52] U.S. Cl. ........................................ 24/442; 24/450; 24/452
[58] Field of Search ................. 24/442, 450, 452, 306, 24/304, 587, 577, 400, 399, 16 PB, 30.5 P, 17 AP; 383/63, 65

[56] References Cited

U.S. PATENT DOCUMENTS

| | | |
|---|---|---|
| 14,762 | 11/1919 | Springer . |
| Re. 24,613 | 3/1959 | Hageltorn . |
| 410,447 | 9/1889 | Rich . |
| 495,775 | 4/1893 | Bonnamy . |
| 772,412 | 10/1904 | Garrett et al. . |
| 983,093 | 1/1911 | Svenson . |
| 1,330,737 | 2/1920 | Coffman . |
| 1,751,926 | 3/1930 | Kielberg . |
| 1,912,180 | 5/1933 | Cornell . |
| 2,144,755 | 1/1939 | Freedman . |
| 2,249,764 | 7/1941 | Hothersall . |
| 2,499,898 | 3/1950 | Anderson . |
| 2,693,875 | 11/1954 | Chaffee . |
| 2,766,814 | 10/1956 | Sedlacek . |
| 2,841,850 | 7/1958 | Zahorski . |
| 2,979,119 | 4/1961 | Kramer . |
| 2,994,117 | 8/1961 | McMullin . |
| 3,009,235 | 11/1961 | De Mestral . |
| 3,015,869 | 1/1962 | Rapata . |
| 3,020,613 | 2/1962 | Morin . |
| 3,031,730 | 5/1962 | Morin ..................................... 24/452 |
| 3,038,225 | 6/1962 | Ausnit . |
| 3,066,366 | 12/1962 | Wyckoff et al. . |
| 3,078,532 | 2/1963 | Bywater . |
| 3,083,737 | 4/1963 | De Mestral . |
| 3,101,517 | 8/1963 | Fox et al. . |
| 3,141,221 | 7/1964 | Faulls, Jr. . |
| 3,147,528 | 9/1964 | Erb . |
| 3,192,589 | 7/1965 | Pearson . |
| 3,247,848 | 4/1966 | Mathison . |
| 3,263,292 | 8/1966 | Fekete . |
| 3,266,113 | 8/1966 | Flanagan, Jr. . |
| 3,312,583 | 4/1967 | Rochlis . |
| 3,338,285 | 8/1967 | Jaster . |
| 3,347,298 | 10/1967 | Ausnit et al. . |
| 3,353,662 | 11/1967 | Pickin . |
| 3,364,530 | 1/1968 | Kraus . |
| 3,372,442 | 3/1968 | Ishimatsu . |
| 3,403,429 | 10/1968 | Smith . |
| 3,408,705 | 11/1968 | Kayser et al. . |
| 3,410,327 | 11/1968 | Ausnit . |
| 3,416,991 | 12/1968 | Yoshimura . |
| 3,494,244 | 2/1970 | Wayland . |
| 3,514,815 | 6/1970 | Evans . |
| 3,518,727 | 7/1970 | Eberle et al. . |
| 3,534,780 | 10/1970 | Hockmeyer . |
| 3,546,754 | 12/1970 | Erb ........................................ 24/450 |
| 3,572,191 | 3/1971 | Bannies . |
| 3,592,428 | 7/1971 | McFarlane . |

(List continued on next page.)

FOREIGN PATENT DOCUMENTS

| | | |
|---|---|---|
| 2213686 | 10/1972 | Fed. Rep. of Germany . |
| 1232367 | 10/1960 | France . |
| 376328 | 5/1964 | Switzerland . |
| 898124 | 6/1962 | United Kingdom . |
| 1078193 | 8/1967 | United Kingdom . |
| 1161406 | 8/1969 | United Kingdom . |

Primary Examiner—Victor N. Sakran
Attorney, Agent, or Firm—William W. Haefliger

[57] ABSTRACT

A connector means comprising a plurality of parallel ridges configured so that inverted ridge means may be nested between and gripped by certain of the ridges. The connector means also includes means to confirm complete, adjusted interlock of the nested ridges. Also disclosed are products that would incorporate such connector means, and means to produce same.

32 Claims, 8 Drawing Sheets

U.S. PATENT DOCUMENTS

| | | |
|---|---|---|
| 3,600,027 | 8/1971 | Noland et al. . |
| 3,619,913 | 11/1971 | Albrecht . |
| 3,620,896 | 11/1971 | Glasgow . |
| 3,633,787 | 1/1972 | Katz . |
| 3,648,404 | 3/1972 | Ogsbury et al. . |
| 3,653,099 | 4/1972 | Hoffman . |
| 3,654,052 | 4/1972 | Rye . |
| 3,686,718 | 8/1972 | Brumlik . |
| 3,708,833 | 1/1973 | Ribich et al. . |
| 3,735,449 | 5/1973 | Rosales . |
| 3,758,657 | 9/1973 | Menzin et al. . |
| 3,762,000 | 10/1973 | Menzin et al. . |
| 3,808,646 | 5/1974 | Brumlik ................................ 24/452 |
| 3,808,648 | 5/1974 | Billarant et al. . |
| 3,808,649 | 5/1974 | Ausnit . |
| 3,900,652 | 9/1975 | Uraya et al. . |
| 4,073,090 | 2/1978 | Lucia . |
| 4,169,303 | 10/1979 | Lemelson . |
| 4,290,174 | 9/1981 | Kalleberg . |
| 4,322,875 | 4/1982 | Brown et al. . |
| 4,502,194 | 3/1985 | Morris et al. . |
| 4,557,024 | 12/1985 | Roberts et al. . |
| 4,674,778 | 6/1987 | Ruiz . |
| 4,727,659 | 3/1988 | Walker . |
| 4,794,028 | 12/1988 | Fischer . |
| 4,872,242 | 10/1989 | Allan . |
| 4,872,243 | 10/1989 | Fischer . |
| 4,910,362 | 3/1990 | Kinner . |
| 4,947,525 | 8/1990 | Van Erden . |
| 4,984,339 | 1/1991 | Provost et al. . |
| 5,070,584 | 12/1991 | Dais et al. . |
| 5,088,162 | 2/1992 | Allan . |

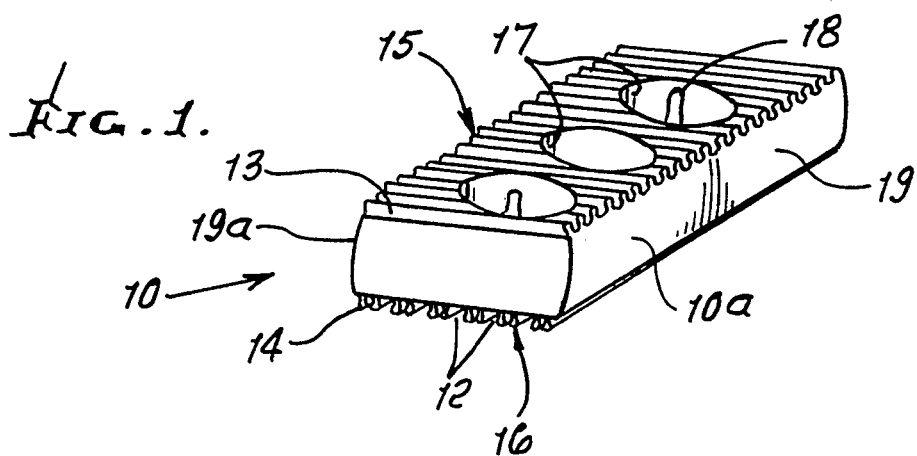
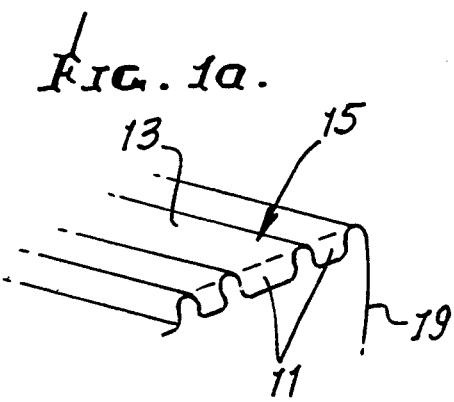
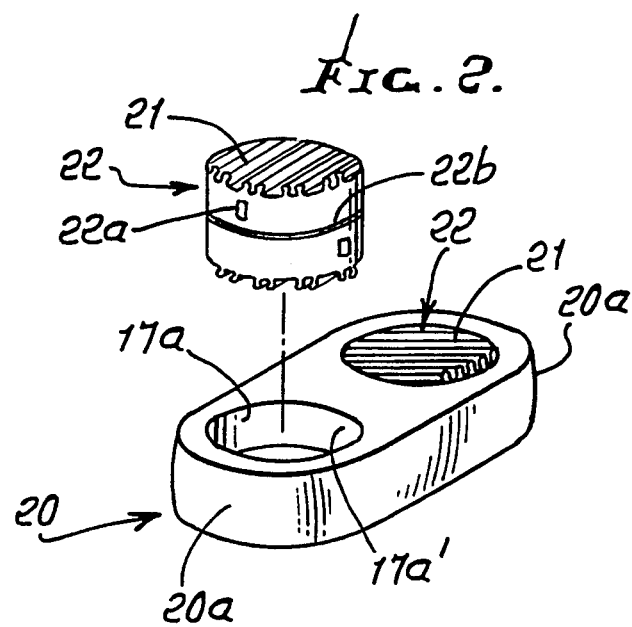
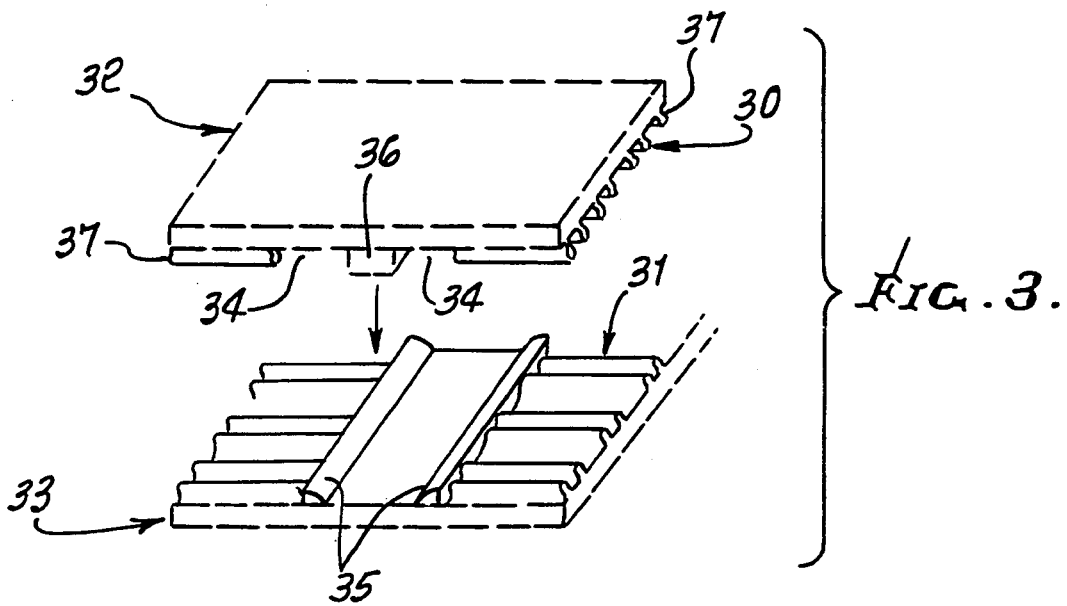

CONNECTOR APPARATUS WITH NESTING RIDGES

BACKGROUND OF THE INVENTION

This application is a continuation-in-part of Ser. No. 787,424 filed Nov. 12, 1991, which is a continuation-in-part of Ser. No. 553,258 filed Jul. 16, 1990, now U.S. Pat. No. 5,088,162 issued Feb. 8, 1992, and all of which are incorporated herein by reference.

The referenced application Ser. No. 787,424 relates generally to an elongated, strap-like connector with generally C-shaped cross sections configured to nest ridges of an opposing strap end. Also, random sections of the strap-like connector were provided that may be affixed to objects so as to allow their connection. With certain types of objects, it becomes more economical and practical to integrate or mold a connector means employing ridges directly on or onto the surface of an object or objects, during their manufacture, rather than affixing a connector to the object as a second operation.

Hook and loop-type fasteners have proven to be very practical and a great commercial success. Hook and loop-type connectors employ two specialized connector parts. One part uses a field of small, flexible hooks on a strap. Hooks randomly, and with the shear strength in lateral and longitudinal directions, hook into a field of looping fibers on another strap. Hook and loop applications may require more surface of connector than is desired.

U.S. Pat. No. 4,872,243 to Fischer and U.S. Pat. No. 4,984,339 to Provost disclose tapering hooks suited for hook and loop-type connectors. As will be seen, whereas the side views of their hooks appear somewhat similar to the cross section end view of a type of ridge of the present invention, the connectors are not functionally similar, as for example in plan view. Moreover, the hooks for hook and loop-type fasteners, as disclosed in Fischer and Provost, are configured to engage loops not hooks.

Also, Provost discloses a greatly detailed tapered hook to be vertically extracted from an injection mold or the roller-type mold disclosed by Fischer. Provost discloses a hook with a lateral thickness of about 0.012 inches, which may be ideal for engaging loops but lacks the necessary lateral width to engage a similarly configured hook.

Fischer discloses an elongated member with a multiplicity of flexible hook-like projections extending from one surface of a base, being formed by extrusion of molten plastic into a cooled forming roller having a plurality of hook-forming cavities, and a second pressure roller. Fischer also discloses forming the hook mold cavities by engraving or etching the outside edge of 1/16 inch thick, 8-inch diameter metal plates.

Certain types of flat, flexible, molded, plastic straps, such as bundle or wire tires, connect randomly in one direction. They are generally much stronger than hook and loop connectors of equal width in their one specialized direction. They employ one or more rows of ridged teeth. Typically, unlike hook and loop connection, the design requires a buckle or similar device to assure connection; and typically, once connected, they cannot be loosened. Other molded, flexible, flat, plastic strap designs with teeth and no buckle have both design and mold design problems. Referenced application Ser. No. 787,424 recognized these problems with a different approach. To differentiate from the connectors of prior art, rounded ridges were claimed and configured to nest into flexible, C-shaped openings formed by smaller, flexible ridges. Teeth might be added to control lateral movement of the nested ridged in the C-shaped openings. Means to confirm interlock was also claimed.

Certain improvements to the invention were claimed in referenced application Ser. No. 787,424. One major improvement was the combining of the larger and smaller ridges, so that the connector consisted of one cross section configuration, instead of two. If used on a small strap, each side of the strap looped and connected to the same side or the opposite side. The flexing of the ridges in combination with the deletion of certain ridges allowed the simultaneous nesting of a series of ridges, even though their outer cross section widths were greater than the openings they would be inserted into.

Tightly nested ridges on a strap of the type described can control lateral movement through friction. Loosely connected ridges of several designs can have lateral movement controlled when a means to block lateral movement is added. Such blocking means might be teeth in the C-shaped valleys between the ridges, on the ridges, or the blocking means may be flexible, ratchet-like teeth. One or more ridges placed perpendicularly to the main row ridges also may function as a blocking means for loosely filled ridges. Alternately, a series of ridges may be designed to fit loosely in combination with one or more ridges positioned so as to position other ridges to prevent their accidental disconnection.

Loosely fitted ridge-to-ridge-type connectors can have ease of connection and disconnection while having far greater shear strength than hook-to-loop-type connectors and more versatility than connectors requiring buckle-type apparatus.

There is also need for incorporating into certain molded or extruded products a means to connect such products to other objects, simply and economically.

SUMMARY OF THE INVENTION

The present invention concerns provision of a plurality of parallel ridges configured and spaced to nest inverted ridge means, where a connection of or to surfaces or objects is desired. An invention disclosed in U.S. patent application Ser. No. 787,464 provided C-shaped cross sections formed by the side walls of ridges and of a strap-like connector. In the present invention, the ridges form the side walls of the C-shaped opening or openings, while the remainder of the C-shape is formed by whatever object the ridges are placed or formed on.

It is one object of this invention that the ridges be molded onto the surfaces of children's plastic toys, such as building blocks. Leggo ® building blocks typically have small pegs on one side, configured to nest into the non-peg side of similar blocks. The peg side of a Leggo ® toy typically is only configured to connect to the non-peg side of a Leggo ® part. It is an object of this invention that ridges on both sides of a child's building block will connect, interchangeably. It is a further object of this invention that the building blocks, when joined, such as in stacking, may be adjusted to "stair step" generally to any degree desired.

It is an added object of this invention that up to forty small ridges or more, per inch, may be incorporated onto a product's surface, such as a child's building block, so that such surface appears relatively flat yet has small, lateral perforations through the surface to each outside edge.

It is another object of this invention that holes be added to the building blocks with ridges, which may be configured to accept Leggo ®-type pegs.

It is yet another object of this invention that ridge protuberances and/or variable cross sections, which may be rounded, oblong, hooked, tapered, angular, sloping, or pointed on one or both sides of a ridge may be used to assist ridge nesting based on the intended use of the product to be connected.

It is a further object of this invention that loosely, nesting ridges, configured for ease of connection/disconnection of objects, may incorporate a means to control their lateral engagement.

It is another object of this invention that grooves and/or ridges running perpendicular to the ridges may be used to control lateral engagement of ridges.

It is a yet further object of this invention that an object may gain means to connect it to other objects by placing a plurality of laterally placed perforations through the surface of the object, to the lower terminus of a plurality of ridges, the side walls of which are formed by such perforations. The connection means employs means to confirm when a complete, adjusted connection is made.

It is an additional object of this invention that certain ridges need not nest or contact the side walls of a plurality of other ridges to achieve interlock of the connector means, but that the connector means still has means to achieve complete interlock.

Yet another object is the provision of a connector means connectible to inverted ridge means and comprising:

a) a plurality of parallel ridges spaced apart and configured so that the inverted ridge means may be nested between and gripped by certain of the parallel ridges, b) the parallel ridges having mid-sections and outer terminus portions, the mid-sections being widthwise narrower than the outer terminus portions and sufficiently narrow to allow the outer terminus portions to flex, relative to the mid-sections, c) and including means associated with the connector means to confirm complete, adjusted interlock of the inverted ridge means with the parallel ridges in response to the nesting, d) and including an object to which the connector means is connected.

It is an added object of this invention that a connector means may have ridges with curving hook-like, outer termini; and said ridges may have a generally narrowing width progressively from the base to the outer termini in order to reduce friction and allow the ridge to temporarily straighten when being vertically extracted from an injection mold or twin roller mold.

It is yet another object of this invention that injection-type or roller molds for forming parallel ridges with outer terminus portions, being widthwise wider than the mid-section portions, are sufficiently narrowed to allow the vertical extrusion of hot, partially flexible, wider, outer ridge portions through the narrower ridge mold mid-section.

It is a further object of this invention to employ cooled twin rollers to continuously mold a flexible base with a plurality of the ridge connector means of this invention on one or both sides of the base.

It is yet another object of this invention that some ridges with hook-like termini may hook loosely with similarly configured ridges, while others may be configured so that their outer termini nest into and expand the hook-like termini of other ridges, so as to be firmly gripped in order to control lateral movement.

It is an additional object of this invention that such ridges with hook-like termini have an average cross section width as small as approximately 0.008 inches, to achieve desired flexibility.

It is yet a further object of this invention that a plurality of rows of ridges have laterally offset such ridges, so as to control lateral, nested, ridge movement.

These and other objects and advantages of the invention, as well as the details of an illustrative embodiment, will be more fully understood from the following specification and drawings, in which:

DRAWING DESCRIPTION

FIG. 1 is a view of a child's building block, showing connector ridges on the top and bottom surfaces; and FIG. 1a is an enlarged fragmentary view of such ridges;

FIG. 2 is a perspective view of a child's building block, and showing connector ridges on the top and bottom surfaces of two inserts;

Figure 5:
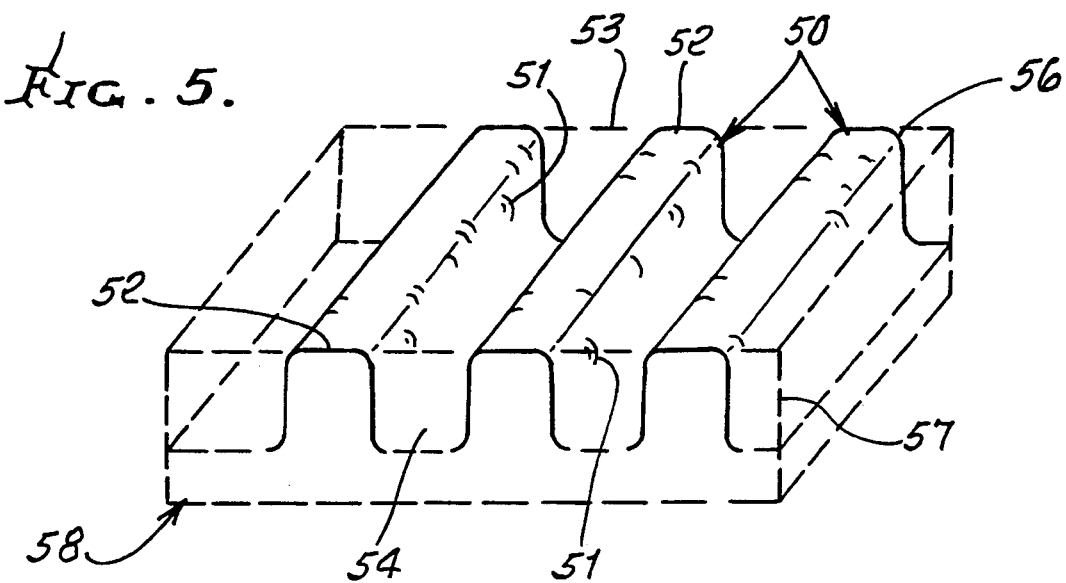
Figure 5A:
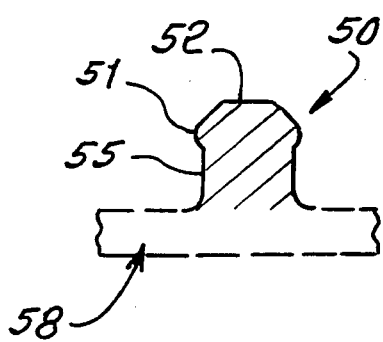
Figure 5B:
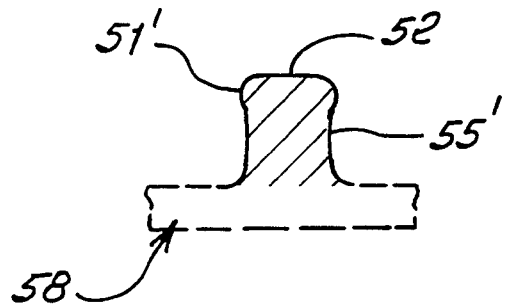
Figure 6:
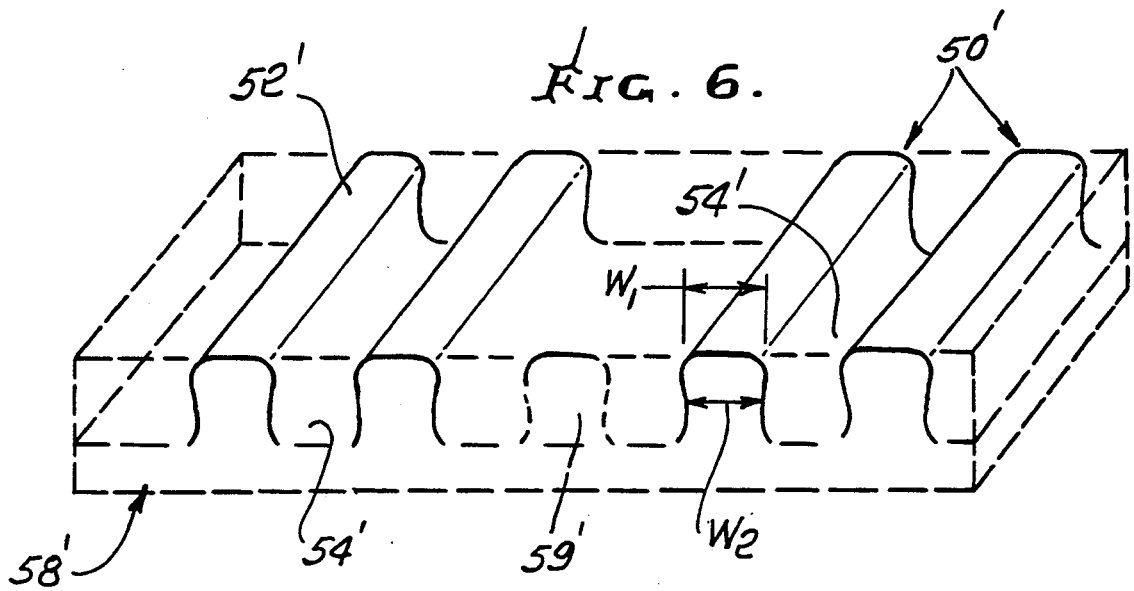
Figure 7:
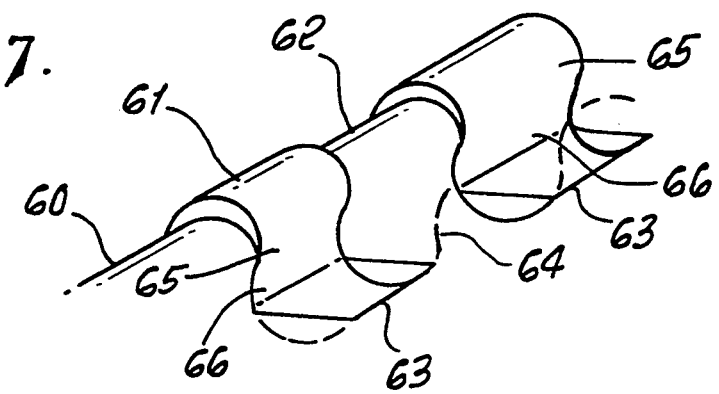
Figure 8:
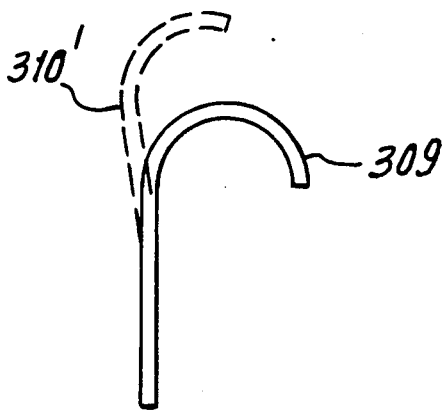
FIG. 8 is a perspective view of lateral ridges positioned with respect to longitudinal ridges and grooves.
Figure 9:
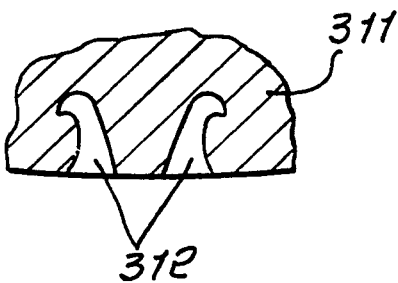
Figure 10:
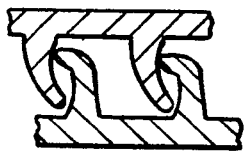
Figure 11:
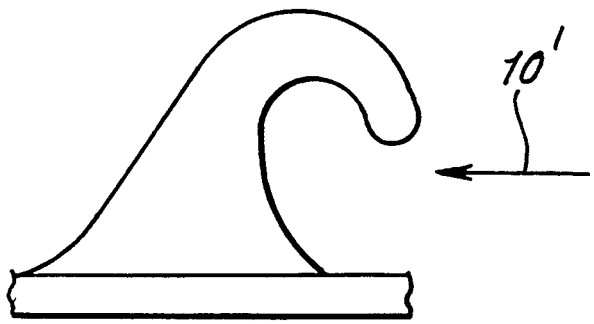
Figure 12:
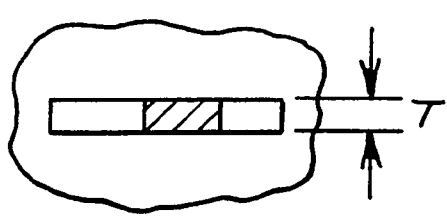
Figure 13:
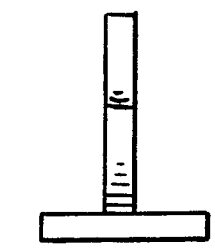
Figure 14:
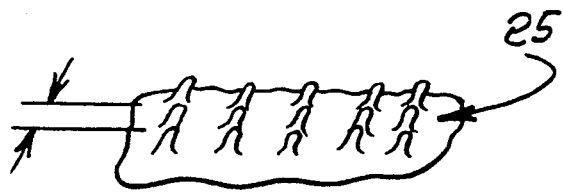
Figure 15:
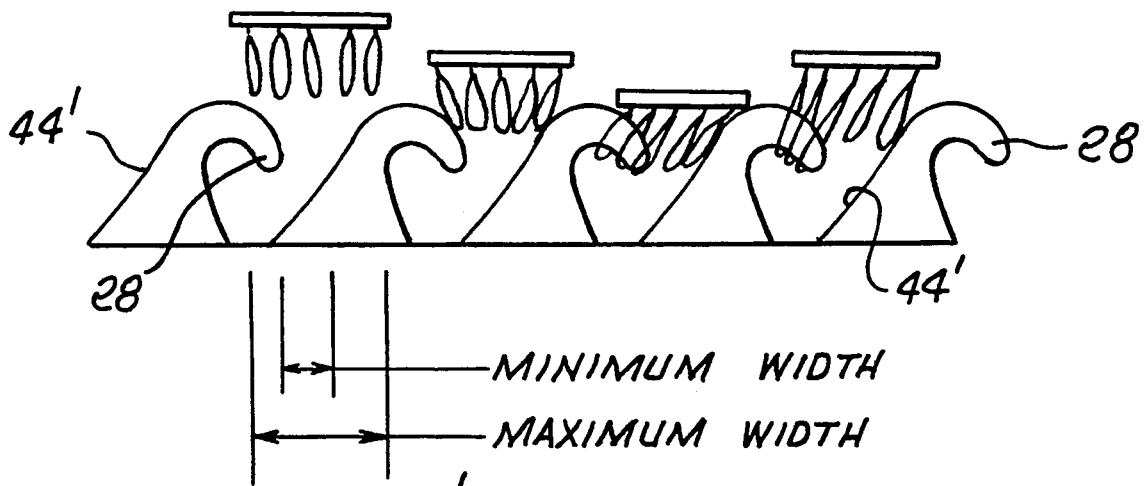
Figure 16:
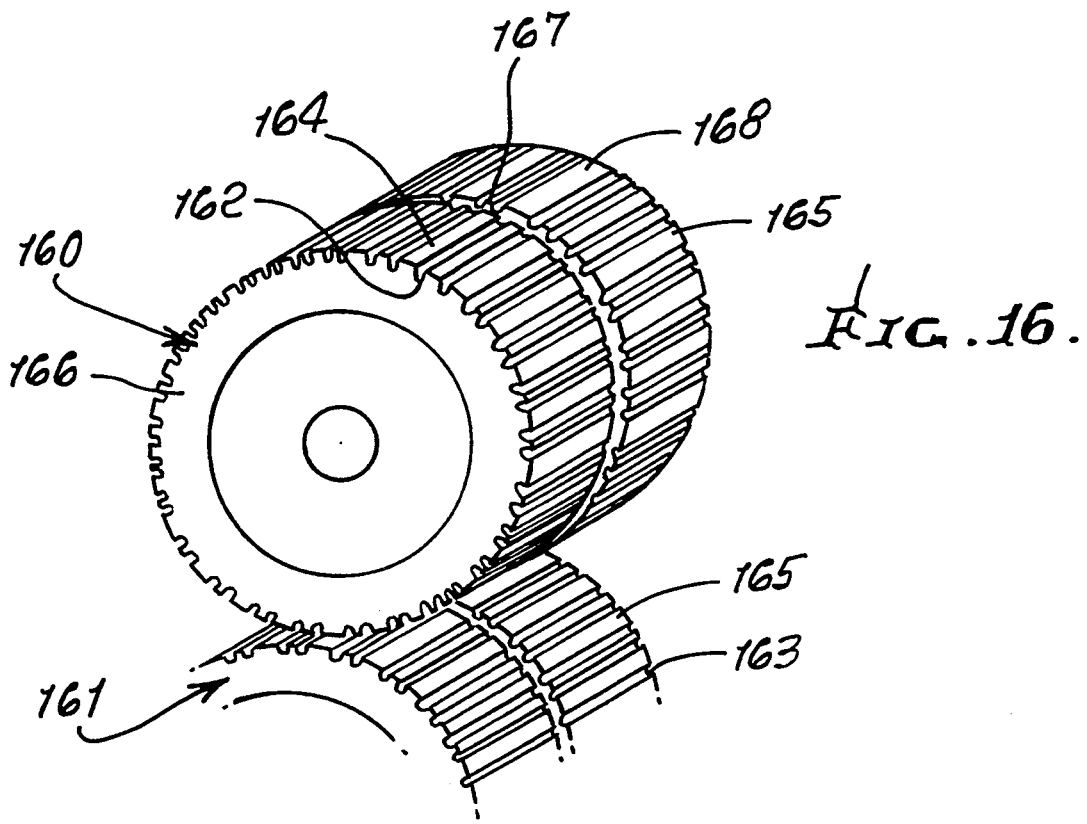
Figure 17:
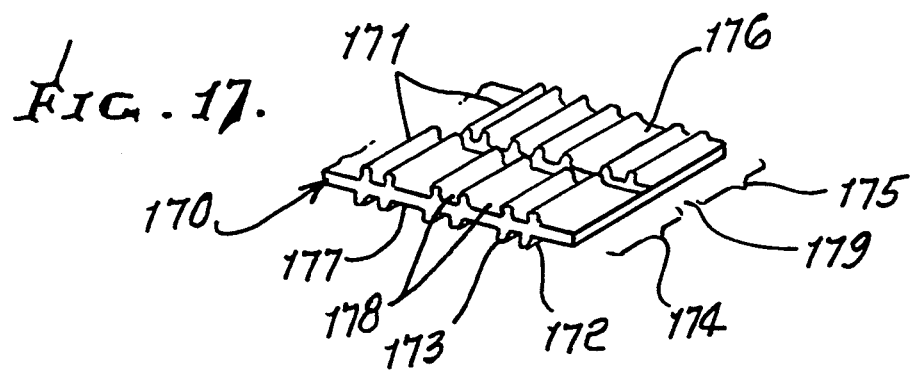
Figure 18:
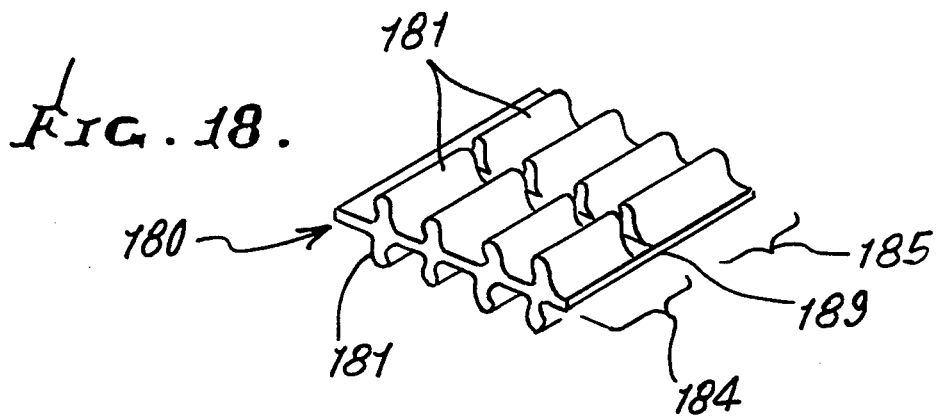
Figure 19:
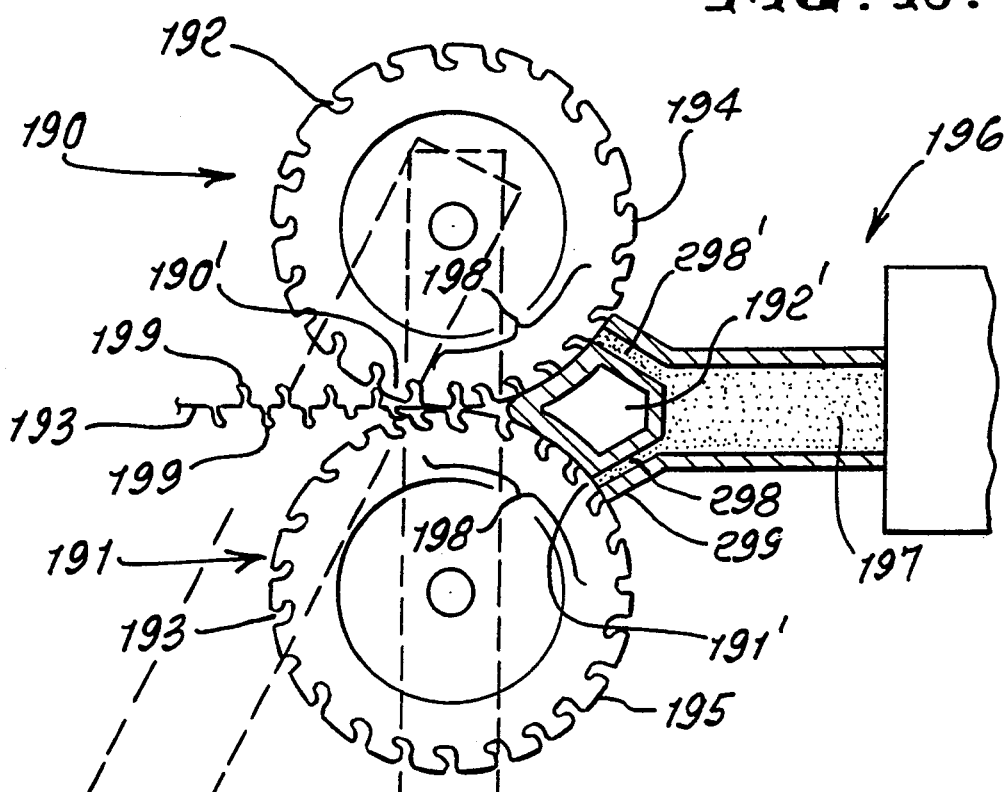
Figure 20:
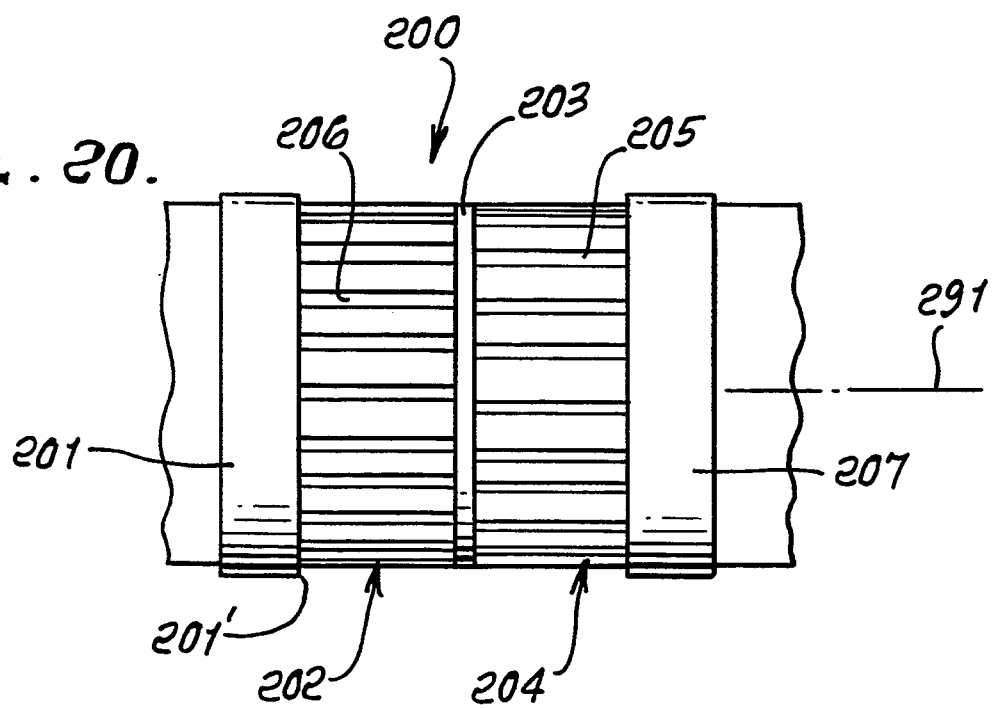
Figure 21:
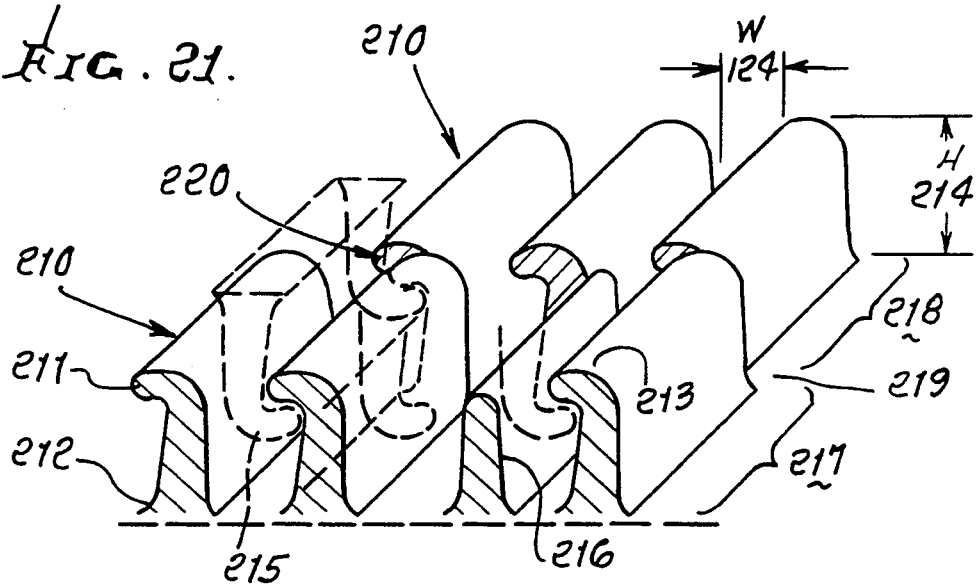
Figure 22:
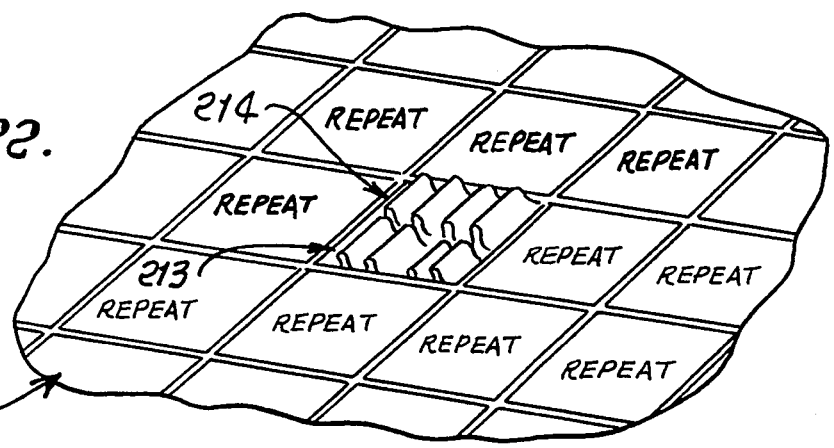
Figure 23:
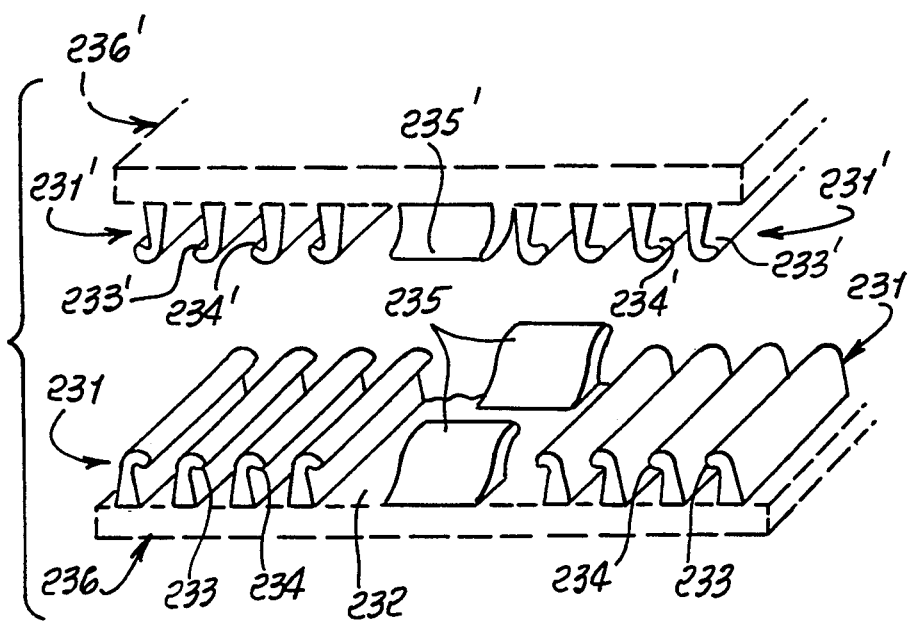

FIGS. 4(a)-4(i) are end views of ridge arrangements showing examples of lateral ridge spacing;

FIG. 5 is a perspective view showing a modified ridge design;

FIGS. 5a and 5b are alternate end views of a section taken on line A—A of FIG. 5;

FIG. 6 is a perspective view showing a modified ridge configuration;

FIG. 7 is a perspective view showing a ridge design with variable cross sections and radii;

FIG. 8 illustrates a prior art monofilament hook;

FIG. 9 illustrates a greatly enlarged side elevation view of the hook-forming cavities of a prior art roller mold;

FIG. 10 illustrates a prior art hook of the type shown in Rochlis U.S. Pat. No. 3,312,583;

FIG. 11 illustrates a prior art hook for hook and loop fasteners of the type shown in Provost U.S. Pat. No. 4,984,339;

FIG. 12 is a typical cross section through the hook of FIG. 11;

FIG. 13 is a front elevation of the hook of FIG. 11 as seen in the direction of arrow 10 in FIG. 11;

FIG. 14 is a diagrammatic representation of a hook material for hook and loop-type fasteners of prior art, as shown in U.S. Pat. No. 4,984,339;

FIG. 15 shows a hook and loop assembly, as disclosed in the U.S. Pat. No. 4,984,339;

FIG. 16 is a fragmentary perspective view showing twin roller molds employed for forming the connectors in accordance with the present invention;

FIG. 17 is a perspective view of a connector of the present invention with a configuration moldable in a continuous strip, with the twin roller molds of FIG. 16;

FIG. 18 is a perspective view of a connector of the present invention having a configuration moldable in a continuous strip with twin roller molds of a similar design to those shown at FIG. 16;

FIG. 19 is an elevation in cross section showing a partial twin roller mold assembly depicting the production of a continuous strip connector depicted at FIG. 18;

FIG. 20 is a frontal view of the surface of cooled twin roller molds of the present invention, illustrating twin rows of ridge-forming cavities;

FIG. 21 is an enlarged perspective view showing a connector with tapering ridges having curved hook-like outer termini configured for ease of engagement with a similarly configured connector illustrating two means to confirm interengagement;

FIG. 22 is a perspective view of a connector with tapering hook-like ridges of the type that can be vertically extracted from the two-roller mold of the present invention, this connector having flexible, ratchet-like teeth configured to allow ratchet-like, one-way advancement of a connector; and FIG. 23 is a view of interengageable connectors, each with tapering hook-like ridges of FIGS. 18 and 21 configurations that can be vertically extracted from the two roller molds of the present invention, the two rows of ridges, which may be of the same type as at FIG. 17, being repeated as often as desired for larger connecting surfaces.

DETAILED DESCRIPTION

In FIG. 1, the body 10a of a child's building block 10 has multiple lateral 11 and longitudinal 12 elongated perforations through the upper 13 and lower 14 portions of the body 10, spaced to form multiple, laterally extending upper ridges 15, and multiple, longitudinally extending lower ridges 16. The ridges 15 and 16 are configured so that two like building blocks, when stacked, will not interlock unless press fitted together, relatively inverted ridges of one block nesting in spaces between relatively upright ridges of the next block. For example, two blocks similar to the block shown at FIG. 1 may be stacked and press fitted together, if the laterally spaced ridges 15 of one block are press fitted to the laterally spaced ridges 15 of the second block. Additional stacking and/or corner connection of blocks may be achieved by simple alignment and inter-nesting of ridges, and associated spaces therebetween. Thus, the (crest center to crest center) "pitch" of ridges on one block is the same as the "pitch" of ridges on the adjacent block. The ridges have mid-sections and outer terminus portions, the mid-sections being widthwise narrower than the outer terminus portions and sufficiently narrow to allow the outer terminus portions to flex, relative to the mid-sections.

It will be understood that the ridges 15 formed on the block upper portion 13, may be run longitudinally like or parallel to ridges 16 on the block bottom portion 14. Similarly, the ridges 16 on the block bottom portion 14 might run laterally like the ridges 15 on the top portion 13. Ridge configurations and spacings similar to those shown at any of FIGS. 4(a)-4(f) can be used, with a partially flexible plastic, such as polypropylene or nylon.

A preferred embodiment employs ridges, as shown in FIG. 5, with a ridge cross section having uniform width of approximately 0.01 to 0.02 of an inch. Larger scale building blocks and other products may use larger scale ridges. Note optional holes 17 through the block 10, in FIG. 1, to reduce the amount of raw material needed, and for lightness. Such holes intersect the ridges 15 and 16. In addition, such holes can be aligned and sized to interfit with pegs, as for example pegs of Leggo ® blocks. In this regard, small protuberances 18 may be located on the interior surfaces of the holes 17 and to project onto the holes, to assist nesting of the Leggo ® pegs, as by frictional engagement with the pegs. Note the side surfaces 19 and 19a of the body 10 are slightly, outwardly, convexly curved, and textured, for a more realistic block effect. Alternately, the outside surfaces 19 may have ridges (not shown) thereon.

In FIG. 2, the child's building block 20 is like that of FIG. 1 but has ridges 21 formed on round inserts 22, receivable in holes 17a and configured to pivot in any desired alignment in such holes. Detents 22a on the cylindrical surfaces of the inserts frictionally hold the inserts in the holes by engagement with hole walls 17a'. Alternately, ridges and grooves may be used at 22b. This building block may be used to build curved objects. Note the curved end walls 20a on the block.

In FIG. 3, ridges 30 and 31 are formed or configured on an upper object 32 and lower object 33 in a manner to enable the objects to be connected by nesting of inverted or downwardly projecting ridges 30 into spaces formed by or between upright ridges 31. Ridges 30 are spaced apart longitudinally, and there is a longitudinally extending medial channel 34 between two groups of the ridges 30, separating these groups, laterally. Channel 34 is configured to nest two longitudinally extending ridges 35, which run perpendicular to lateral ridges 31, on the lower object 33. The ridges 35 may have curved, sloping or angular sides configured to control movement of ridges 30 after connection of ridges 31 and 32. All such ridges may have shapes, as in FIG. 4 or FIG. 8. Channel 34 is shown as divided by an optional medial ridge 36 configured and projecting downwardly to nest to the right or left medial channel 34 of a connector means with a similar ridge 30, channel 34, ridge 36 configuration. It will be understood that one or more longitudinal ridges, such as ridges at 35 and 36, may be employed in various combinations with the ridges 30, such as at the outside edges 37 of ridges 30.

FIG. 4 shows examples of possible spacings of ridges 40. Ridges may be configured to nest or interfit tightly, as at 41, or loosely, as at 42. Ridges 43 may have variable width cross sections, or sideward protuberances 44, to assist connection. Note that ridges 43 are inverted relative to ridges 40, and both have protuberances 44 that interfit, in under-over relation as shown. A preferred embodiment of loose fitting ridges 43 with protuberances 44 is in combination with longitudinal ridges 35 and 36 of FIG. 3. Modified ridges 45 taper from a widthwise narrow end terminus 46 to a wider cross sectional width near the base 47; and the end portions of the ridges may interfit loosely at 49 or tightly to control lateral movement at 49'.

Figure 4A:
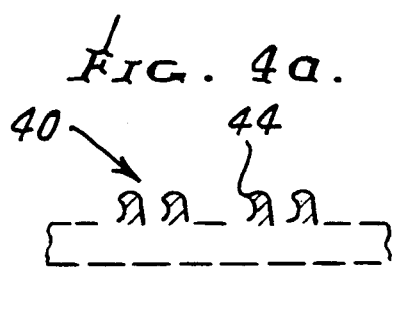
Figure 4B:
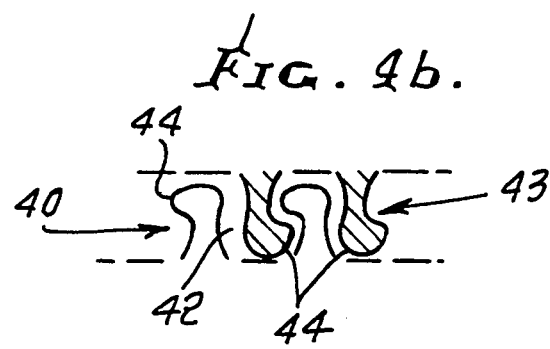
Figure 4C:
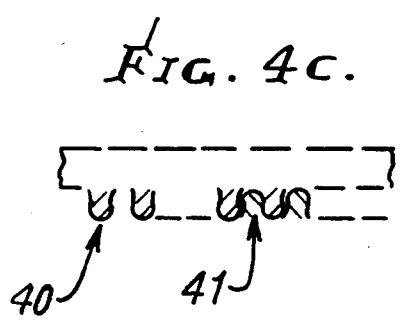
Figure 4D:
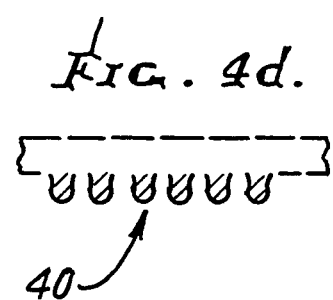
Figure 4E:
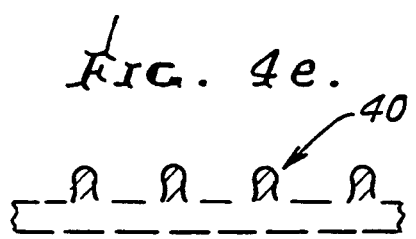
Figure 4F:
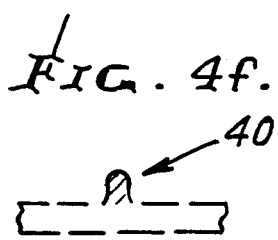
Figure 4G:
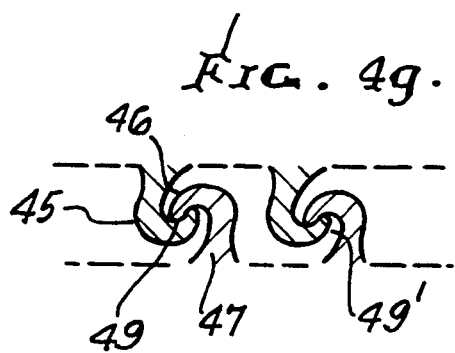
Figure 4H:
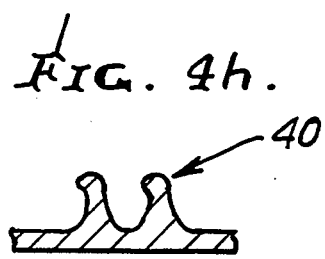

FIG. 4(h) shows ridges 40 with hook-like protuberances 44 to interfit with hook-like protuberances of another connector part, as disclosed in U.S. Pat. No. 5,088,162, of which this application is a continuation-in-part.

Figure 4I:
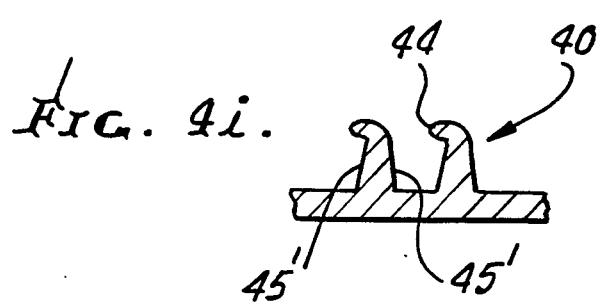

FIG. 4(i) shows improved ridge 40 configured for vertical mold extraction, with hook-like, outer portions 44, and with widthwise continuous widening taper to said outer portion 44 from base 45.

It is understood that a plurality of ridges used for connection on an object may have multiple symmetrical or asymmetrical cross sections, hook-like flanges, protuberances, etc., based on the specific requirements of objects to be connected, the flexibility of the material used, in combination with the size and spacing of the ridges.

FIG. 5 shows a preferred embodiment of ridges 50, to be used with a relatively inflexible plastic body 58 molded with relatively inflexible, rectangular ridges 50 incorporating small, sideward protuberances 51 configured to flex. The outermost projecting (crest) portions 52 of the ridges 50 are relatively flat and squared with the relatively flat sidewalls 55. The preferred embodiment may have ridges with rounded 56, rather than sharp, angular corners, and include missing ridges, such as at 59' in FIG. 6. The object with this ridge design may have valley-like perforations 54 placed laterally through the surface 53 to an outside edge 57 to form ridges 52; ridges of the design allow for vertical extraction from an injection mold and may be used for a variety of objects.

FIGS. 5a and 5b show a cross section of a ridge 50 of FIG. 5 with sideward protuberances 51 and 51' configured to flex and/or compress during nesting of ridges 50 with corresponding inverted ridges, aiding retention and confirming complete, adjusted interlock. Sidewalls 55 and 55' are relatively flat with protuberances 51 and 51' on some or all sidewalls. The sidewalls 51 of FIG. 5b have a tilt relative to the ridge outermost portion 52 and body 58 to improve shear strength in one direction, such as for a wall display assembly.

FIG. 6 shows an improved embodiment of ridges 50' to be used with a relatively inflexible plastic part 58'. It is molded with generally rectangular cross-section ridges 50' suitable to use with children's building blocks, such as shown in FIG. 1. The ridges, near their outer termini, are widthwise at $w_1$ wider than at lower point $w_2$. With this ridge embodiment, certain ridges in a series are missing, as at location 59', to allow some flex of ridges 50' when inverted. Ridges with similar cross sections are nested into spaces 54' between ridges 50'. Ridges 50' may be on one or a plurality of sides of an object, used on a rectangular sheet and/or for a variety of objects.

FIG. 7 shows a ridge 60 having larger, outer ridge diameter portions 61, alternating longitudinally (along the ridge) with smaller, outer ridge diameter portions 62. The ridge portion 61 typically has an accompanying or associated relatively raised section 63 forming the bottom of the valley between the ridges. The alternating smaller, outer ridge diameter portion 62 typically has an adjacent standard section valley bottom 64 below the level of 63. The alternating larger, outer ridge diameter portion 61 has a shorter, longitudinal length than the standard section valley 64, to allow for ridge 61 nesting in valley 64 or a like inverted ridge means. The ridge 60 may have a uniform maximum width at a point 65 adjacent to the larger 61 and smaller 62 outer ridge portions 63. The lower side portion of the ridge at 66, below the outer portions 61 and 62, is widthwise narrower than the uniform maximum ridge width 65. Also, the raised portion 63 may be sloped (not shown) to allow ratchet-like advancement of nested ridges. Portions of the ridge 60, which are raised, as at 61, and the raised valley 63, function as teeth to control longitudinal movement of nested connector sections. It is understood that ridges similar to the ridge in FIG. 7, or other ridge configuration with teeth, offsets or other means may be used to control movement longitudinally rather than perpendicularly to the ridges.

FIG. 8 illustrates a prior art monofilament hook 309 used for hook and loop connectors, configured to randomly engage and flexibly release loops as shown. It bends to position 310' during use.

FIG. 9 illustrates hook-forming cavities 312 in a roller mold 311, as disclosed in prior art, such as U.S. Pat. Nos. 4,872,243 and 4,794,028. The method of use comprises the formation of an extrusion of plastic material between a pair of rollers, one of which is suitably cooled and has a plurality of hook-forming cavities, as shown.

FIG. 10 is a prior art fragmentary sectional view showing how pile outlines may be employed for producing a mechanical pile interlock of sheets, as disclosed in U.S. Pat. No. 3,312,583 to Rochlis.

FIG. 11 illustrates a prior art hook for hook and loop fasteners, as disclosed in U.S. Pat. No. 4,984,339 to Provost.

FIG. 12 is a typical cross section of the hook of FIG. 11.

FIG. 13 is a front elevation of the hook of FIG. 11 as seen in the direction of arrow 10 in FIG. 11. It will be noted that there is no lateral, ridge-like width.

FIG. 14 is a diagrammatic representation of a hook-bearing material having many hooks, as disclosed by Provost, all facing in one direction to provide one-way operation in shear. Note that there appears to be greater lateral spacing between the hooks 25 than there is lateral width "t" of the hooks in FIG. 12.

FIG. 15 is a hook and loop assembly, as disclosed by Provost. The tip portion 28 of each hook extends in the rightward direction and faces the rear inclined surface 44 of the next rightward hook in its pair. The curved tip portion 28 and the inclined surface 44 define a wedge-shaped opening having at the top, as illustrated, a maximum width; and there being a minimum width at the closest point between the front of the tip portion 28 and the adjacent rear surface 44 of the front hook. The cooperation of hook assemblies' wedge-shaped openings and loop assembly in the fastening process is illustrated.

FIG. 16 is a partial view of twin roller molds 160 and 161 employed for forming the connector of the present invention, such as at FIG. 17 and FIG. 18; the cavities 162 and 163 are shown greatly enlarged and are configured to mold ridges similar to those shown at FIG. 4c. The cavities 162 and 163 are slightly narrower near the surface of the molds 164 and 165 requiring the ridges 171 of FIG. 17 to flex slightly when being withdrawn from the mold vertically, as shown at FIG. 19. It should be understood that the ridges shown at FIGS. 4g, 21, 22, and 23 are configured to be molded and vertically extracted from modified cavities 162 and 163, the latter being modified to mirror-image said ridges. The partial view of the upper roller mold 160 in FIG. 16 consists of a coaxial assembly of three rollers 166, 167 and 168. The surface 164 of roller 166 has been scribed laterally with a wire EDM machine to create the cavities 162; and this roller may be assembled only with an unscribed roller (or rollers), such as at 167, and be 1 inch or smaller in width to 12 inches in width or wider. In addition, a continuously molded connector strip may be molded by having the lower roller molds free of cavities so that the resultant strip has laterally elongated connector ridges on one side only. Note that the recesses in the mold or molds (to form ridges) extend parallel to the roller axis, or roller axes, so that parallel ridges may be formed, with hook ends forming in the same direction, i.e., the direction of strap relative travel between the molds, i.e., rollers, for example.

FIG. 17 illustrates a strap-like connector 170 wherein the mid-sections 172 of ridges 171 are widthwise narrower than the outer terminus portions 173. Two rows of such ridges are illustrated at 174 and 175 on the top surface 176 of the connector 170; and two rows of ridges 174' and 175' (not visible) are on the bottom surface 177 of the connection 170, and have the same ridge-to-ridge spacing as the ridges at 174 and 175. The upper and lower ridges at 175 and 175' laterally do not align with upper and lower ridges at 174 and 174' to prevent lateral movement of ridges nested in the valleys 178 of a similarly configured connector, prevented from moving laterally. A slight, lateral separation 179 between the two rows 174 and 175 of lateral ridges may be provided to enhance or improve flexibility of the connector 170, so that exact lateral alignment of said ridges 171 into said valleys is not necessary.

FIG. 18 illustrates a strap-like connector 180 wherein the hook-like ridges 181 are tapered, as shown in greater detail at FIG. 21. The ridges are arranged in form similar to FIG. 17. A space 189 may be provided between rows of ridges 184 and 185, this space 189 widthwise to be narrower than the ridges 181 are widthwise or laterally.

FIG. 19 illustrates a cross sectional view of the rollers 190 and 191 of FIG. 16 modified to mold FIG. 18-type ridges and assembled with hot liquid plastic injector assembly 196, hot liquid plastic 197 is injected via dual paths 298 and 298' in flow guide 299 into roller mold cavities 192 and 193, which are shown greatly enlarged allowing the cooled molds at 198 to solidify the ridges 199 prior to their being pulled from the roller cavities 192 and 193 at 190'. There is a slight gap at 191' between the injector mold assembly 196 and the converging surfaces of the molds 194 and 195, the injector assembly 196 having a heated portion at 192' to maintain the desired liquid flow of plastic in the gap at 191'. The gap 191' is, for example, approximately one half the thickness of the strap-like strip 193'.

FIG. 20 is a partial view of a roller mold assembly 200 showing first a non-cavity roller 201 with a slightly larger diameter at 201' than the adjacent roller mold 202, for example like mold 191. A non-cavity roller 203 is provided coaxially next to 202 to form the space 179 of FIG. 17 or 189 of FIG. 18; and a second roller mold is provided at 204, with cavities 205 not aligned in an axial direction with the cavities 206 of roller mold 202; and a final, non-cavity roller 207 is provided to the right of 204 and similar to roller at 201. All such rollers are coaxial (see axis 291). It should be understood rollers 203 and 204 may be eliminated, so that a formed strip might have only one row of ridges molded in cavities 206; alternately, the mold assembly might have numerous rollers similar to those at 202, 203 and 204, so that the patterns of ridges as at FIGS. 17 or 18 can be repeated, such as seen at FIG. 22 in longitudinal and lateral rows.

FIG. 21 represents a partial detailed view of a preferred ridge design for vertical extraction from the roller mold cavities of FIG. 16, 19 and 20, or an injection mold. Ridges 210 taper toward an outer, hook-like, overhanging terminus 211 from a wider cross section near the ridge base 212, so that the ridges may be vertically extracted from the mold cavity 192 and 193 of FIG. 19. The hot, flexible, plastic, hook-like section 213 will temporarily straighten during extraction as at 190 in FIG. 19. The opening W-124 between pairs of ridges may be slightly wider than the ridge terminus portion 213 for ease of nesting of another inverted ridge seen in broken lines at 215; and a special ridge means to assure longitudinal interlock is provided at 216 and is characterized as of less height than ridges 210, and as being hook-free to come together in opposed ridges 210 during interlock.

Alternately, the space w-214 may be narrower than the outer terminus portion 213 of ridges 210, which would require a plurality of ridges 210 to flex during nesting. The two parallel rows of ridges 217 and 218 may have a slight separation 219 between them, which is widthwise narrower than the lateral dimensions of the ridges in rows 217 and 218. The ridges of row 218 are out of alignment laterally with the ridges of row 217, so that, when similarly configured and spaced, inverted ridges 215 are nested, lateral movement is blocked and lateral interlock is confirmed as at 220. Ridges may be quite small, such as less than 0.04 inches high, as indicated at H-214' and 0.01 inches wide at 212.

FIG. 22 represents the cluster of ridges of FIG. 21, that cluster being repeated in a plurality of rows, such as at 213 and 214 of FIG. 21, so that portions of a sheet of material 221 may be cut and used as a connector, as desired. The sheet of material 221 may have a thickness for improved flexibility as small as approximately 0.008 inches.

FIG. 23 shows a cluster of like, generally flexible, inwardly curved ridges 231 on object 236, which are curved toward a common, central area 232, said ridges 231 being configured to interlock with generally flexible, outwardly curved cluster of ridges 231', i.e., curved away from common central area 232' associated with object 236'. The inwardly curved ridge termini 233 are spaced to loosely nest and be held by the outwardly curved, hook-like, surfaces at 233'; conversely, the outwardly curved third cluster of ridge termini 234' are spaced to loosely nest and be held by the inwardly curved, inner, hook-like surfaces 234 on ridges in a fourth cluster on object 236. Flexible, ratchet-like teeth at 235 and 235' are configured to project laterally and allow ratchet-like, one-way adjustment of object 236 relative object 236'.

In all forms of the invention, the ridges nest in such a way as to confirm complete, adjusted interlock.

I claim:

1. Connector means connectible to inverted ridge means, comprising:
    a) a plurality of parallel ridges spaced apart and configured so that inverted ridge means are nestable between and gripped by certain of said parallel ridges,
    b) said parallel ridges having height, lateral widths, mid-sections, and outer terminus portions, and characterized in that said certain parallel ridges lateral widths are sufficient that said parallel ridges grip said inverted ridge means nested and aligned therewith,
    c) and including means associated with said connector means to confirm complete, adjusted interlock of said inverted ridge means with said parallel ridges in response to said nesting,
    d) and including an object to which said connector means is connected.

2. The combination of claim 1 wherein a plurality of said certain ridges are spaced and configured to allow relatively loose nesting of said ridge means with said certain ridges which extend longitudinally, and including means associated with said connector means to control lateral movement of said certain ridges.

3. The combination of claim 1 wherein said parallel ridges extend longitudinally and including means associated with connector means to control lateral movement of said parallel ridges.

4. The combination of claim 1 including said inverted ridge means nested below and gripped by certain of said parallel ridges.

5. The combination of claim 4 wherein said nesting of the ridge means and said inverted ridge means is characterized by one of the following:
loose interfit
tight interfit.

6. The combination of claim 5 wherein said variable cross sections include alternating relatively large and relatively small cross sections.

7. The combination of claim 1 wherein said inverted ridge means includes inverted parallel ridges having inverted mid-sections and inverted outer terminus portions adapted to flex relative to said inverted mid-sections.

8. The combination of claim 6 wherein said inverted parallel ridge outer terminal portions are nested between certain mid-sections of said parallel ridges, with corresponding outer terminal portions flexed to accommodate said nesting.

9. The connector means of claim 1 including children's building blocks to which said connector means is connected.

10. The combination of claim 8 wherein said blocks define at least one hole to receive a peg.

11. The connector means of claim 1 including children's toys to which said connector means is connected.

12. The connector means of claim 1 including sports equipment to which said connector means is connected.

13. The combination of claim 1 including another of said objects with ridges thereon as in claim 1, the ridges on the two objects having nesting interengagement.

14. The combination of claim 1 wherein the ridges extend longitudinally, and there being longitudinal channel means intersecting the ridges to divide the ridges groups.

15. The combination of claim 1 wherein the ridges have side walls characterized by one or more of the following:
slanting
sloping
curved
undercut
flat
C-shaped
angular
flexible
inflexible
hook shaped.

16. The combination of claim 1 wherein said ridges are each characterized by:
variable cross sections along the ridge length.

17. The combination of claim 16 wherein said relatively large cross sections have associated adjacent valleys with relatively raised bottoms, and said relatively small cross sections are associated adjacent valleys with relatively lower bottoms.

18. The connector means of claim 1 wherein said mid-sections are thicknesswise narrower than said outer terminus portions and sufficiently narrow to allow said outer terminus portions to flex, relative to said mid-sections.

19. Connector means connectible to inverted ridge means, comprising:

a) a plurality of parallel ridges spaced apart and configured so that inverted ridge means are nestable between and gripped by certain of said parallel ridges, b) said parallel ridges having lateral widths, mid-sections and outer terminus portions, said mid-sections being sufficiently narrow to allow said outer terminus portions to flex, relative to said mid-sections, and characterized in that said certain parallel ridges lateral widths are sufficient that said parallel ridges grip said inverted ridge means nested and aligned therewith, c) and including means associated with said connector means to confirm complete, adjusted interlock of said inverted ridge means with said parallel ridges in response to said nesting, d) and including an object to which said connector means is connected, e) and wherein said connector means includes auxiliary ridge means associated with and configured perpendicular to said parallel ridges.

20. Connector means connectible to inverted ridge means, comprising:

a) a plurality of parallel ridges spaced apart and configured so that inverted ridge means are nestable between and gripped by certain of said parallel ridges, b) said parallel ridges being generally inflexible, c) said parallel ridges each having side walls, and a top and bottom in cross section normal to ridge length, and wherein said cross section is generally rectangularly shaped, said parallel ridges also having height, lateral widths, mid-sections, and outer terminus portions, d and including means associated with said connector means to confirm complete, adjusted interlock in response to said nesting, e and including an object to which said connector means is connected.

21. The connector means of claim 11 including children's building blocks to which said connector means is connected.

22. The combination of claim 12 wherein said blocks define at least one hole to receive a peg.

23. The connector means of claim 11 including children's toys to which said connector means is connected.

24. The connector means of claim 11 including sports equipment to which said connector means is connected.

25. Connector means connectible to inverted ridge means having inverted ridges, comprising:

a) a plurality of parallel ridges spaced apart and configured to grip inverted ridge means nested between certain of said parallel ridges, b) said parallel ridges having height, lateral widths, mid-sections, and outer terminus portions, said mid-sections being sufficiently narrow to allow said outer terminus portions to flex, relative to said mid-sections, and characterized in that certain parallel ridges lateral widths are sufficient that said parallel ridges grip said inverted ridge means nested and aligned therewith, c) and including means associated with said connector means to confirm complete, adjusted interlock of said inverted ridge means with said parallel ridges in response to said nesting, d) and wherein certain ridges are spaced apart and configured to nest a single ridge of said inverted ridge means between them and wherein other ridges are spaced apart and configured to nest a plurality of inverted ridges of said ridge means,
e) and including an object to which said connector means is connected.

26. Connector means connectible to inverted ridge means, comprising:
   a) a plurality of parallel ridges spaced apart and configured so that inverted ridge means may be nested between and gripped by certain of said parallel ridges,
   b) said parallel ridges having lateral widths, and being generally inflexible, and characterized in that certain parallel ridges lateral widths are sufficient that said parallel ridges grip said inverted ridge means nested and aligned therewith,
   c) and including means associated with said connector means to confirm complete, adjusted interlock of said inverted ridge means with said parallel ridges in response to said nesting,
   d) and including an object to which said connector means is connected,
   e) and including a block forming a hole, said object, including said parallel ridges, being an insert received in said hole, to be rotatable therein whereby the ridges rotate with the insert relative to the block.

27. A connector means comprising:
   a) a plurality of parallel ridges spaced apart and configured so that inverted ridge means are nestable between and gripped by certain of said parallel ridges,
   b) said parallel ridges having modified cross section means configured to hook onto hook-like cross sections of said ridge means,
   c) said parallel ridges in cross section having base means, mid-section means, and ridge hook terminus means, said ridge cross section having taper from said terminus means to said base means,
   d) and including means associated with said parallel ridges to confirm adjusted interlock of said parallel ridges with said ridge means,
   e) and wherein said connector means is connected to an object and including said object having said connector means.

28. The connector means of claim 27 wherein the ridges are formed in clusters spaced apart in longitudinally and laterally extending rows.

29. The connector means of claim 28 wherein each cluster includes two groups of ridges at opposite sides of a mid-region, and further characterized by at least one of the following:
   i) the mid-region is free of said ridges
   ii) the hook terminus means of each group projects toward or away from said mid-region
   iii) there are ratchet teeth in said mid-region attached to said object and further characterized by at least one of the following:
      x₁) the ratchet teeth project in the direction of elongation of said ridges
      x₂) the ratchet teeth are spaced apart in the elongation direction of the ridges.

30. A connector means comprising:
   a) a plurality of parallel ridges spaced apart and configured so that inverted ridge means may be nested between and gripped by certain of said parallel ridges,
   b) said parallel ridges having modified cross section means configured to hook onto hook-like cross sections of said ridge means,
   c) said parallel ridges in cross section having base means, mid-section means, and ridge hook terminus means, said ridge cross section having taper from said terminus means to said base means,
   d) and including means associated with said parallel ridges to confirm adjusted interlock of said parallel ridges with said ridge means,
   e) and wherein said connector means is connected to an object and including said object having said connector means,
   f) and wherein there are a plurality of offset rows of parallel ridges configured so that nested, inverted, ridge means are blocked from lateral movement by said offset ridges.

31. The method of forming a connector means comprising
   a) a plurality of parallel ridges spaced apart and configured so that inverted ridge means may be nested between and gripped by certain of said parallel ridges,
   b) said parallel ridges having mid-sections and outer terminus portions, said mid-sections being sufficiently narrow to allow said outer terminus portions to flex, relative to said mid-sections,
   c) and including means associated with said connector means to confirm complete, adjusted interlock of said inverted ridge means with said parallel ridges in response to said nesting,
   d) and wherein said method includes:
      i) providing two interengageable molds, at least one of which is a roller,
      ii) forming recesses in at least one of the molds, to sequentially face the mold as the roller rotates,
      iii) and shaping and orienting said recesses so that each recess is elongated in a direction parallel to the roller axis,
      iv) whereby material fed between and squeezed between said rollers is extended into said elongated recesses, and sequentially, as the roller rotates.

32. The method of forming a connector means comprising
   a) a plurality of parallel ridges spaced apart and configured so that inverted ridge means are nestable between and gripped by certain of said parallel ridges,
   b) said parallel ridges having modified cross section means configured to hook onto hook-like cross sections of said ridge means,
   c) said parallel ridges in cross section having base means, mid-section means, and ridge hook terminus means, said ridge cross section having taper means from said terminus means to said base means,
   d) and including means associated with said parallel ridges to confirm adjusted interlock of said parallel ridges with said ridge means,
   e) there being ridge structure for blocking lateral movement of said inverted ridge means,
   f) and wherein said method includes
      i) providing two interengageable molds, at least one of which is a roller,
      ii) forming recesses in at least one of the molds, to sequentially face the mold as the roller rotates,
      iii) and shaping and orienting said recesses so that each recess is elongated in a direction parallel to the roller axis,
      iv) whereby material fed between and squeezed between said rollers is extended into said elongated recesses, and sequentially, as the roller rotates.

* * * * *